G. W. TUCKER.
Device for Attaching Drawer-Pulls.

No. 222,213.　　　　　Patented Dec. 2, 1879.

Attest:
Courtney A. Cooper.
William Paxton.

Inventor:
George W. Tucker
By his attorney
Charles E. Foster

UNITED STATES PATENT OFFICE.

GEORGE W. TUCKER, OF WATERBURY, CONNECTICUT.

IMPROVEMENT IN DEVICES FOR ATTACHING DRAWER-PULLS.

Specification forming part of Letters Patent No. 222,213, dated December 2, 1879; application filed September 17, 1879.

*To all whom it may concern:*

Be it known that I, GEORGE W. TUCKER, of Waterbury, New Haven county, State of Connecticut, have invented an Improved Attachment for Drawer-Pulls, of which the following is a specification.

My invention is an attachment for drawer-pulls, &c., constructed as fully described hereinafter, to secure a broad bearing inside the drawer, to prevent displacement, and to facilitate and cheapen the manufacture.

Figure 1:
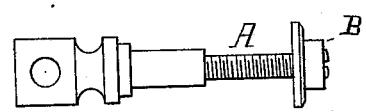
Figure 2:
Figure 3:
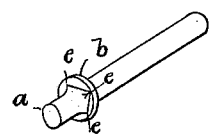
Figure 4:
Figure 5:
Figure 6:
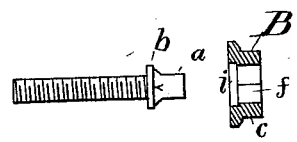

In the drawings forming part of this specification, Figure 1 is a side view, showing the attachment applied to the shank of a drawer-pull; Fig. 2, an end view of Fig. 1; Fig. 3, a perspective view of the screw-blank; Fig. 4, an end view of Fig. 3; Fig. 5, an end view of the head detached; and Fig. 6, a sectional view, showing the head and screw separated.

The attachment is a screw consisting of a threaded stem, A, and head B. The stem has a cylindrical end, $a$, and a flange or shoulder, $b$, the end at its junction with the shoulder having four equidistant lips, $e$. This stem A may be drawn and pressed from a cylindrical wire, but is preferably made of soft cast metal, the thread being either cut or cast upon the stem. The head B has a square projection, $c$, a square opening, $f$, adapted to receive the end $a$, and a recess, $i$, adapted to receive the shoulder or flange $b$ of the stem. This head B is cast, preferably, of hard metal, and is firmly secured to the stem A by introducing the end $a$ into the opening $f$ and then spreading the end, which operation may be quickly effected by a tool cutting cross-grooves $x$, as shown in Fig. 2. The head is thus clamped between the flange $b$ and the spread end $a$, and is prevented from turning by the lips $e$ fitting the corners of the opening $f$. The lips may, however, be dispensed with, and the recess $i$ and flange $b$ may be angular.

The above construction permits the article to be produced at a comparatively slight cost. The head B is most firmly secured to the stem, so that it cannot be displaced by constant use, and so that it cannot turn upon the stem, while an extended bearing is afforded within the drawer. As the flange $b$, as well as the inner face of the head B, bears against the inner side of the drawer, there is no tendency to draw the head from off the stem when the screw is tightened.

I claim—

1. The combination of the threaded stem A, its shoulder $b$, and end $a$, extending beyond said shoulder, and the head B, having a recess, $i$, and opening $f$, beyond which the head is spread, substantially as set forth.

2. The combination of the head B, having an angular opening, $f$, and recess $i$, and threaded stem A, having a flange, $b$, adapted to the recess $i$, and end $a$, with lips $e$, and distended, substantially as specified.

In testimony whereof I have signed my name to this specification in the presence of two subscribing witnesses.

G. W. TUCKER.

Witnesses:
 WALTER H. COOKE,
 D. N. PLUME.